United States Patent
Neudeck

(10) Patent No.: US 7,883,572 B2
(45) Date of Patent: Feb. 8, 2011

(54) CLEANABLE DUST FILTER COMPRISING A ZIGZAG PLEATED FILTER PACK

(75) Inventor: Eckhard Neudeck, Lübeck (DE)

(73) Assignee: Camfil AB, Stockholm (SE)

( * ) Notice: Subject to any disclaimer, the term of this patent is extended or adjusted under 35 U.S.C. 154(b) by 233 days.

(21) Appl. No.: 12/160,107

(22) PCT Filed: Jan. 12, 2006

(86) PCT No.: PCT/SE2006/000045
§ 371 (c)(1),
(2), (4) Date: Jan. 14, 2009

(87) PCT Pub. No.: WO2007/081245
PCT Pub. Date: Jul. 19, 2007

(65) Prior Publication Data
US 2009/0217820 A1    Sep. 3, 2009

(51) Int. Cl.
*B03C 3/155* (2006.01)
(52) U.S. Cl. .............................. 96/67; 96/69
(58) Field of Classification Search ........... 96/15, 96/67, 69; 55/360, 497, 521, 528
See application file for complete search history.

(56) References Cited

U.S. PATENT DOCUMENTS

| 408,749 A | 8/1889 | Robinson | |
| 3,914,116 A * | 10/1975 | Westlin | 55/500 |
| 4,323,374 A * | 4/1982 | Shinagawa et al. | 96/58 |
| 4,509,958 A * | 4/1985 | Masuda et al. | 96/60 |
| 4,853,005 A * | 8/1989 | Jaisinghani et al. | 96/60 |
| 4,978,372 A * | 12/1990 | Pick | 96/67 |
| 5,403,383 A * | 4/1995 | Jaisinghani | 95/69 |
| 6,117,216 A * | 9/2000 | Loreth | 96/62 |
| 6,491,743 B1* | 12/2002 | Joannou et al. | 96/67 |
| 6,497,754 B2* | 12/2002 | Joannou | 96/67 |
| 6,749,669 B1* | 6/2004 | Griffiths et al. | 96/67 |
| 2005/0045036 A1* | 3/2005 | Vetter et al. | 96/66 |
| 2005/0172812 A1* | 8/2005 | Ueda et al. | 96/67 |

FOREIGN PATENT DOCUMENTS

| EP | 1 240 935 A2 | 9/2002 |
| JP | 61-209061 A * | 9/1986 |
| JP | 63-109723 A | 8/1988 |
| JP | 10-76148 A | 3/1998 |

* cited by examiner

Primary Examiner—Richard L Chiesa
(74) Attorney, Agent, or Firm—Young & Thompson

(57) ABSTRACT

A cleanable filter for particulate material, includes a zigzag pleated filter pack, spacers disposed between the pleats in the filter pack and a frame having an upper and lower part covering the respective upper and lower side of the filter pack that contains the ends of the fold lines and two lateral parts covering the opposite sides of the filter pack that contains the ends of the filter medium zigzag folded into a filter pack, the frame thereby leaving the opposite sides of the filter pack that contains alternate fold lines of the pleated filter pack, free for the passage of air. The filter medium in the filter pack includes a pleated sheet of polytetrafluoroethylene and the spacers between the pleats consist of corrugated aluminum foils. An earthing element furthermore electrically connects the aluminum foils to each other and to an earth connection on the outside of the filter frame.

9 Claims, 1 Drawing Sheet

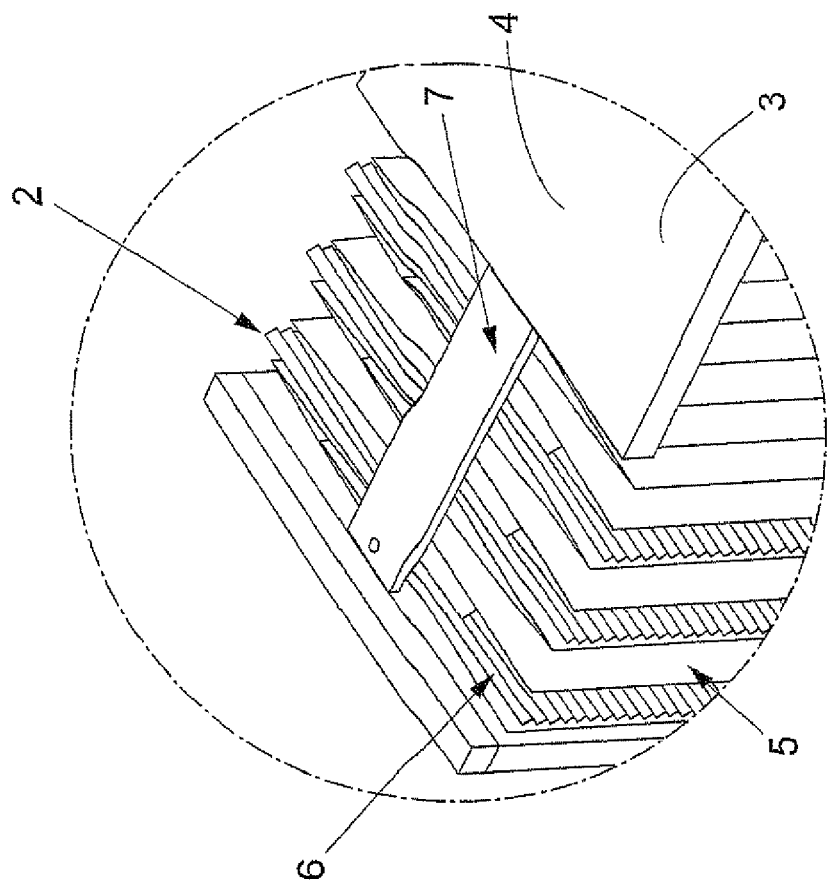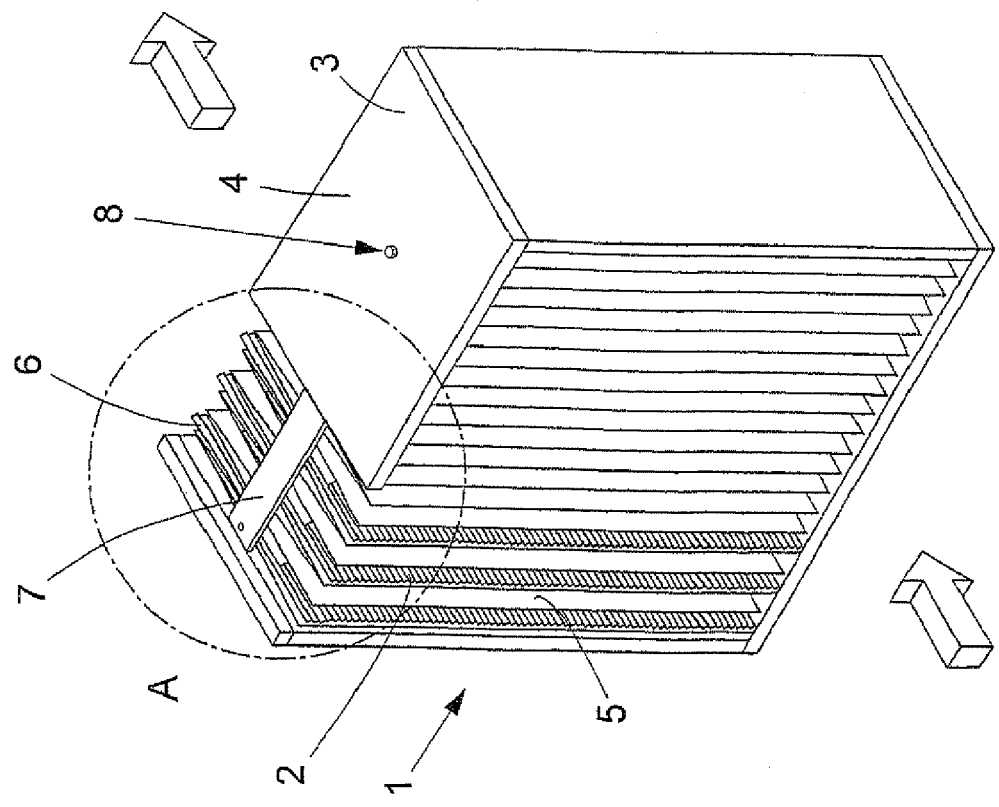

CLEANABLE DUST FILTER COMPRISING A ZIGZAG PLEATED FILTER PACK

FIELD OF INVENTION

The present invention relates to a cleanable filter for particulate material, especially dust, comprising a zigzag pleated filter pack, spacers placed between the pleats in the filter pack and a frame having an upper and lower part covering the respective upper and lower side of said filter pack containing the ends of the fold lines and two lateral parts covering the opposite sides of said filter pack containing the ends of the sheet of filter medium zigzag folded into a filter pack, said frame thereby leaving the opposite sides of the filter pack containing alternate fold lines of the pleated filter pack free for the passage of air.

BACKGROUND OF THE INVENTION

In many industrial processes a lot of dust is produced. In order to prevent such dust from entering the atmosphere outside the locality in which the industrial process takes place, filters are commonly used. The dust captured in the filter reduces the air permeability thereof so after a certain time the dust in the filter has to be removed in order to achieve an appropriate function of the filter. Said removal of dust is accomplished by blowing a burst of air through the filter from the clean-air side, i.e. the side leading to the outside atmosphere, or by vibrating of the filter. The dust removed from the filter is gathered in a closed system and eventually taken care of.

A problem encountered with such filters is that service life of the known filters is relatively short due to high pressure loads thereon during their filtering operation and an even higher load during the cleaning operation independent of if the cleaning is made by blowing air through the filter or subject the filter to vibration forces. A consequence thereof is that maintenance costs for such filters are high. Another problem is that all dust does not leave the filter as a consequence of the cleaning operation and the air permeability of the filter will decrease by time which of course will lead to a shorter service life of the filter.

The objective of the present invention is to solve these problems at least to a significant degree by providing a more robust filter construction having a longer service life than known cleanable filters.

SUMMARY OF THE INVENTION

This objective is accomplished with a cleanable filter for particulate material, especially dust, comprising a zigzag pleated filter pack, spacers placed between the pleats in the filter pack and a frame having an upper and lower part covering the respective upper and lower side of said filter pack containing the ends of the fold lines and two lateral parts covering the opposite sides of said filter pack containing the ends of the filter medium zigzag folded into a filter pack, said frame thereby leaving the opposite sides of the filter pack containing alternate fold lines of the pleated filter pack free for the passage of air, characterised in that the filter medium in the filter pack include a pleated sheet of polytetrafluoroethylene (PFTE), in that the spacers between the pleats consist of corrugated aluminium foils and in that an earthing element electrically connect the aluminium foils to each other and to an earth connection on the outside of the filter frame.

In a preferred embodiment the element electrically connecting the spacers together is an elongate piece of sheet metal extending along the upper or lower side of the filter pack.

The spacers between the pleats can have ends extending outside the upper or lower side of said filter package and said elongated element of sheet metal is then pressed against said ends of the spacers.

In an alternative the elongate element of sheet metal can have a row of projections protruding in between the pleats of the filter pack and into contact with the sides of the spacers.

The spacers existing between pleats of the filter pack all are preferably present in a central region between the opposing sides of the filter pack containing alternate folds. Advantageously, the spacers having their free ends turned against one side of the filter pack containing alternate fold lines are thicker than the spacers having their free ends turned against the opposite side.

BRIEF DESCRIPTION OF THE DRAWINGS

The invention will now be described with reference to the enclosed Figures, of which;

FIG. 1 is a schematic perspective view of a cleanable filter according to a preferred embodiment of the present invention with a portion of the upper wall of the frame removed in order to better show the structure of the filter pack, and FIG. 2 is a detail of FIG. 1 in a larger scale.

DESCRIPTION OF EMBODIMENTS

A cleanable filter 1 according to a first embodiment is disclosed in FIGS. 1 and 2. Filter 1 comprises a filter pack 2 and a frame 3 circumferentially surrounding the filter pack 2, leaving the front and rear sides of the filter pack 2 free for the passage of air. In FIG. 1 arrows indicate the direction of air during filtering of dust from the air. In the Figures a portion of the upper wall 4 is removed in order to clearly illustrate the construction of the filter pack 2.

The filter pack consist according to the invention of a zigzag folded sheet 5 of PTFE (polytetrafluoroethylene) material in which spacers 6 of corrugated aluminium foils are inserted between the folded parts of sheet 5. The spacers 6 inserted from the front side of the filter pack, i.e. from the dusty air side, are 30 µm thick and the spacers 6 inserted from the rear side, i.e. from the clean air side, are 100 µm thick. All of the spacers have such an extension that they are present in an area midway between the front and rear side of the filter.

The frame 3 surrounding the filter pack 2 is fastened to the lateral sides as well as the upper and lower side of the filter pack, preferably by gluing in order to obtain a leak free connection between the filter pack and the frame. The frame can be made of plywood, galvanised sheet metal or stainless steel.

The filter 1 also includes an electrostatic discharge system in order to ensure that dust explosions due to sparks from static discharge. This system includes a grounding element in the form of an elongate strip 7 of sheet metal which is connected to an earth bolt 8 extended to the outside of the frame 3 of the filter. The strip 7 connects all of the spacers 6 to each other and thereby also to the earthing screw. In the shown embodiment, the spacers extend with their upper ends somewhat above the upper part of the zigzag folded media of filter PTFE material and the strip 7 is pressed into contact with these upper ends of the spacers. It is of course also possible to affix the strip to the spacers, for example by soldering or brazing, which can be necessary if a metal wire is used instead of a relatively rigid metal strip as is the case in the present embodiment. The use of a relatively rigid strip is therefore preferred. Such a strip also reduces the risk for the grounding element or its connections to the spacers to be broken during the operation of the filter which entails high loads on the filter, especially during the cleaning step, in which the filter pack is subjected to a pressure of 5-6 bars.

In an alternative, the strip 7 can have protrusions on the underside thereof which can be brought into contact with the spacers 6, for example resilient elements threaded onto the upper ends of the spacers and held in contact thereto by inherent clamping force.

In the embodiment shown the strip is disposed on the upper side of the filter pack but it can of course instead be disposed on the lower side thereof.

The use of a PTFE medium entails two major advantages. Firstly, such a medium has a very smooth surface with very small openings therein. Thereby, the risk for dust particles to be stuck to the surface of the filter medium in the openings thereof or be stuck between fibres in the medium is much smaller than for conventional filter media, such as reinforced glass-fibre media. A filter according to the present invention can therefore be operational for a much longer time than conventional filters whose filter surface becomes by and by less permeable with time which will produce an increase in pressure over the filter and thereby necessitate a cleaning thereof. The cleaning operation for a filter according to the present invention will also be much more efficient than for conventional filters since virtually approximately all dust particles will have left the filter after a cleaning operation. A filter according to the present invention will consequently have a much longer service life than conventional filters and less maintenance costs, both directly and indirectly (less need for stop of process due to filter failure).

The filter according to the present invention is also of a more robust construction than conventional filters, both in respect of filter medium and spacers and can therefore better withstand the stresses caused by the cleaning and operation of the filter. This will also contribute to a long service life of such a filter.

The embodiment described can of course be modified without leaving the scope of invention. The filter medium can be a laminate of a membrane of PTFE material and a carrier material, such as sheet of bonded thermoplastic fibres, the side of the filter medium containing the PTFE membrane being turned to the dusty air side of the filter. A gasket extending around the frame can be provided on the front and/or rear side of the filter. The earth bolt can protrude from one of the lateral sides of the frame instead of the upper side as shown in FIG. 1. The scope of invention shall therefore only be limited by the content of the enclosed patent claims.

The invention claimed is:

1. Cleanable filter (1) for particulate material comprising a zigzag pleated filter pack (2), spacers (6) disposed between the pleats in the filter pack and a frame (3) having an upper (4) and lower part covering the respective upper and lower side of said filter pack that contains the ends of the fold lines and two lateral parts covering the opposite sides of said filter pack that contains the ends of the filter medium (5) zigzag folded into a filter pack, said frame (3) thereby leaving the opposite sides of the filter pack that contains alternate fold lines of the pleated filter pack, free for the passage of air, characterised in that the filter medium (5) in the filter pack include a pleated sheet of polytetrafluorethylene (PFTE), in that the spacers (6) between the pleats consist of corrugated aluminium foils and in that an element (7) electrically connects the aluminium foils to each other and to an earth connection on the outside of the filter frame (3).

2. Filter according to claim 1, wherein the element (7) electrically connecting the spacers together is an elongate piece of sheet metal extending along the upper or lower side of the filter pack (2).

3. Filter according to claim 2, wherein the spacers (6) between the pleats have ends extending outside the upper or lower side of said filter pack and said elongated element (7) of sheet metal is pressed against said ends of the spacers.

4. Filter according to claim 2, wherein said elongate element of sheet metal has a row of projections protruding in between the pleats of the filter pack and into contact with the sides of the spacers.

5. Filter according to claim 1, wherein the spacers (6) existing between pleats of the filter pack (2) all are present in a central region between the opposing sides of the filter pack (2) that contains alternate folds.

6. Filter according to claim 5, wherein the spacers (6) having their free ends turned against one side of the filter pack (2) that contains alternate fold lines, are thicker than the spacers (6) having their free ends turned against the opposite side.

7. Filter according to claim 2, wherein the spacers (6) existing between pleats of the filter pack (2) all are present in a central region between the opposing sides of the filter pack (2) that contains alternate folds.

8. Filter according to claim 3, wherein the spacers (6) existing between pleats of the filter pack (2) all are present in a central region between the opposing sides of the filter pack (2) that contains alternate folds.

9. Filter according to claim 4, wherein the spacers (6) existing between pleats of the filter pack (2) all are present in a central region between the opposing sides of the filter pack (2) that contains alternate folds.

* * * * *